United States Patent [19]
Crabb, Jr. et al.

[11] Patent Number: 5,199,268
[45] Date of Patent: Apr. 6, 1993

[54] AUTOMATIC IN-FEED CONVEYOR SYSTEM FOR AN ICE INJECTOR SYSTEM

[75] Inventors: Richard V. Crabb, Jr., Pacific Grove; Rich Fischer, Aromas; Kevin Nobusada, Salinas, all of Calif.

[73] Assignee: Post-Harvest Technologies, Inc., Salinas, Calif.

[21] Appl. No.: 832,460

[22] Filed: Feb. 6, 1992

[51] Int. Cl.⁵ ............................................. F25D 17/02
[52] U.S. Cl. ........................................ 62/60; 62/374; 62/375
[58] Field of Search ............... 62/374, 375, 60, 64; 198/346.1

[56] References Cited
U.S. PATENT DOCUMENTS

| | | | |
|---|---|---|---|
| 3,527,087 | 9/1970 | Converse, III et al. | 198/346.1 X |
| 3,793,937 | 2/1974 | Lipoma | 62/374 X |
| 4,157,650 | 6/1979 | Guibert | 62/374 |
| 4,249,388 | 2/1981 | Burns | 62/374 X |
| 4,306,646 | 12/1981 | Mogni | 198/346.1 X |
| 4,324,108 | 4/1982 | Billett et al. | 62/375 X |
| 4,484,448 | 11/1984 | Crabb, Jr. | 62/64 |
| 4,722,653 | 2/1988 | Williams et al. | 198/346.1 X |

*Primary Examiner*—William E. Tapolcai
*Attorney, Agent, or Firm*—Davis & Schroeder

[57] ABSTRACT

An automatic in-feed conveyor system for use with an ice injector, having three sections of roller conveyors, a pallet shuttle, and sensors for detecting stacks of cartons and providing signals to a controller. The first conveyor section is a powered conveyor for receiving pallets loaded with cartons of produce. The second conveyor section positions a loaded pallet for insertion into the ice injector and supports the shuttle for inserting and retrieving the pallet into and out of the ice injector. The third conveyor is a discharge conveyor for moving the loaded pallet away from the ice injector. The second and third conveyors have catch basins for collecting the ice melt water from the loaded cartons and returning it to the ice injector.

15 Claims, 17 Drawing Sheets

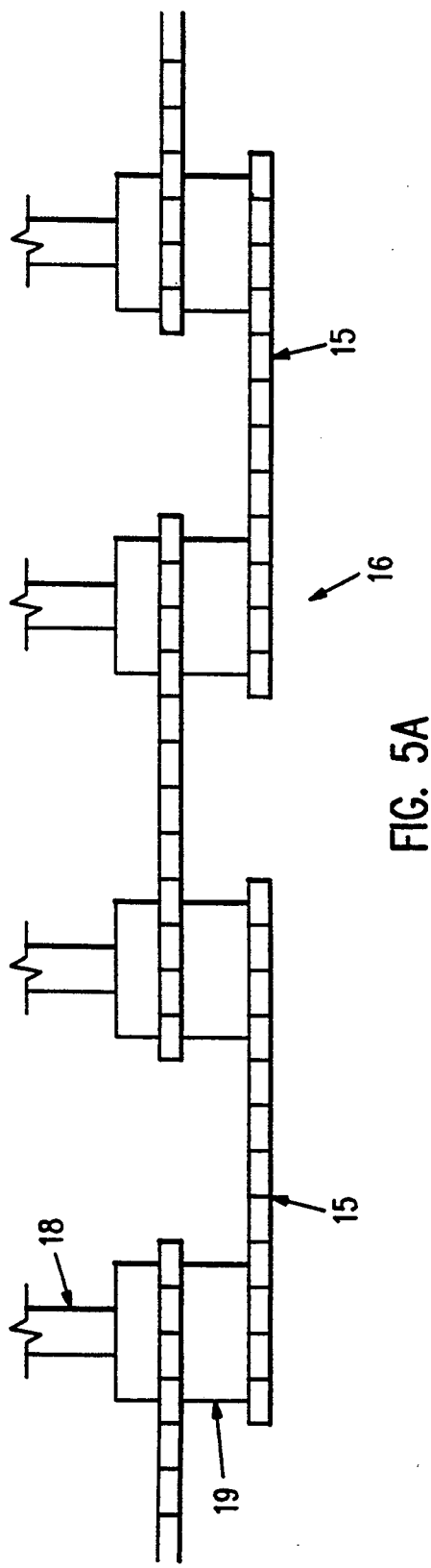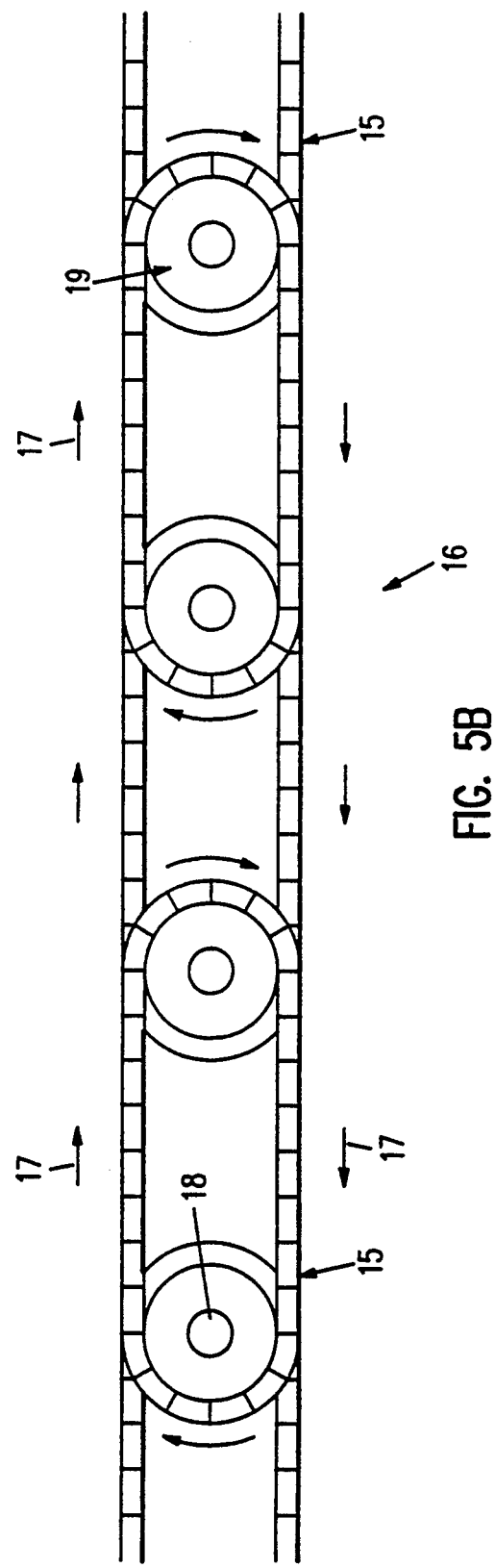
FIG. 5A
FIG. 5B

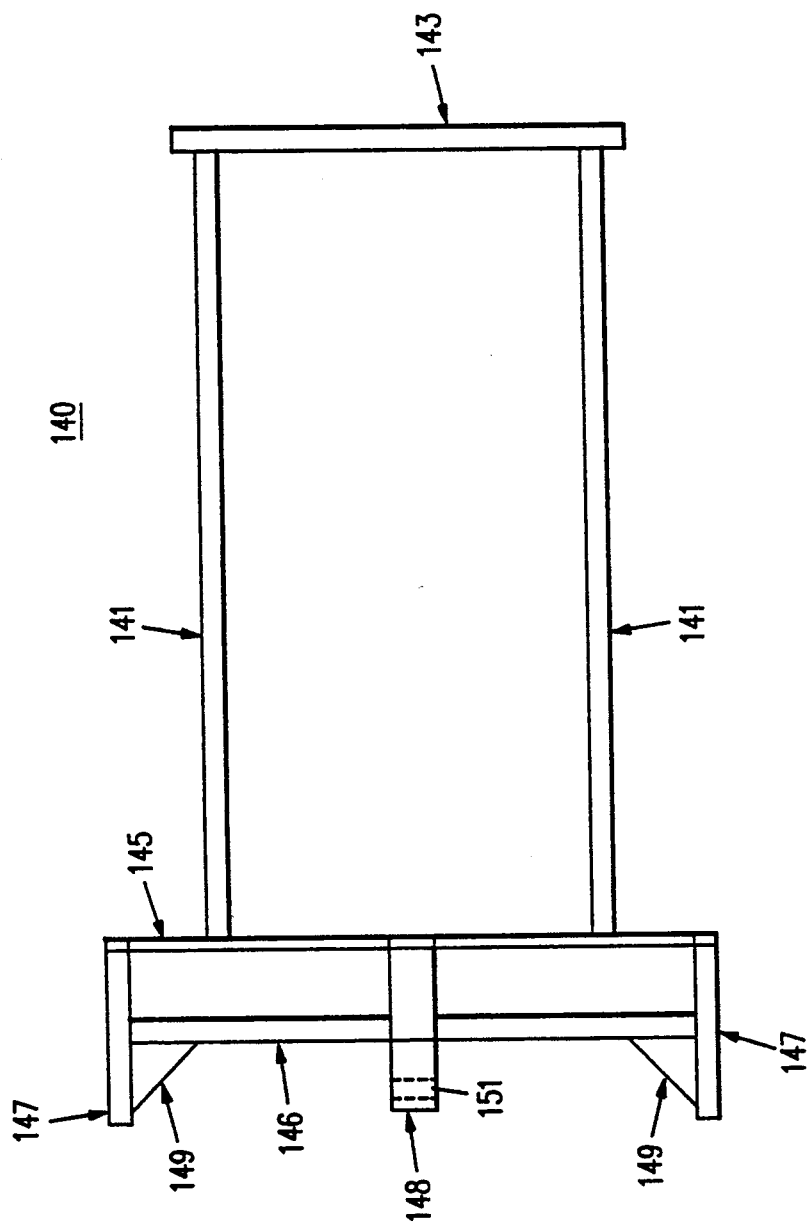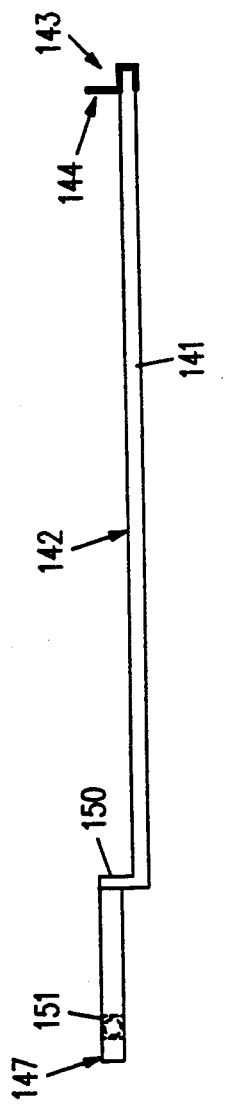
FIG. 6
FIG. 7

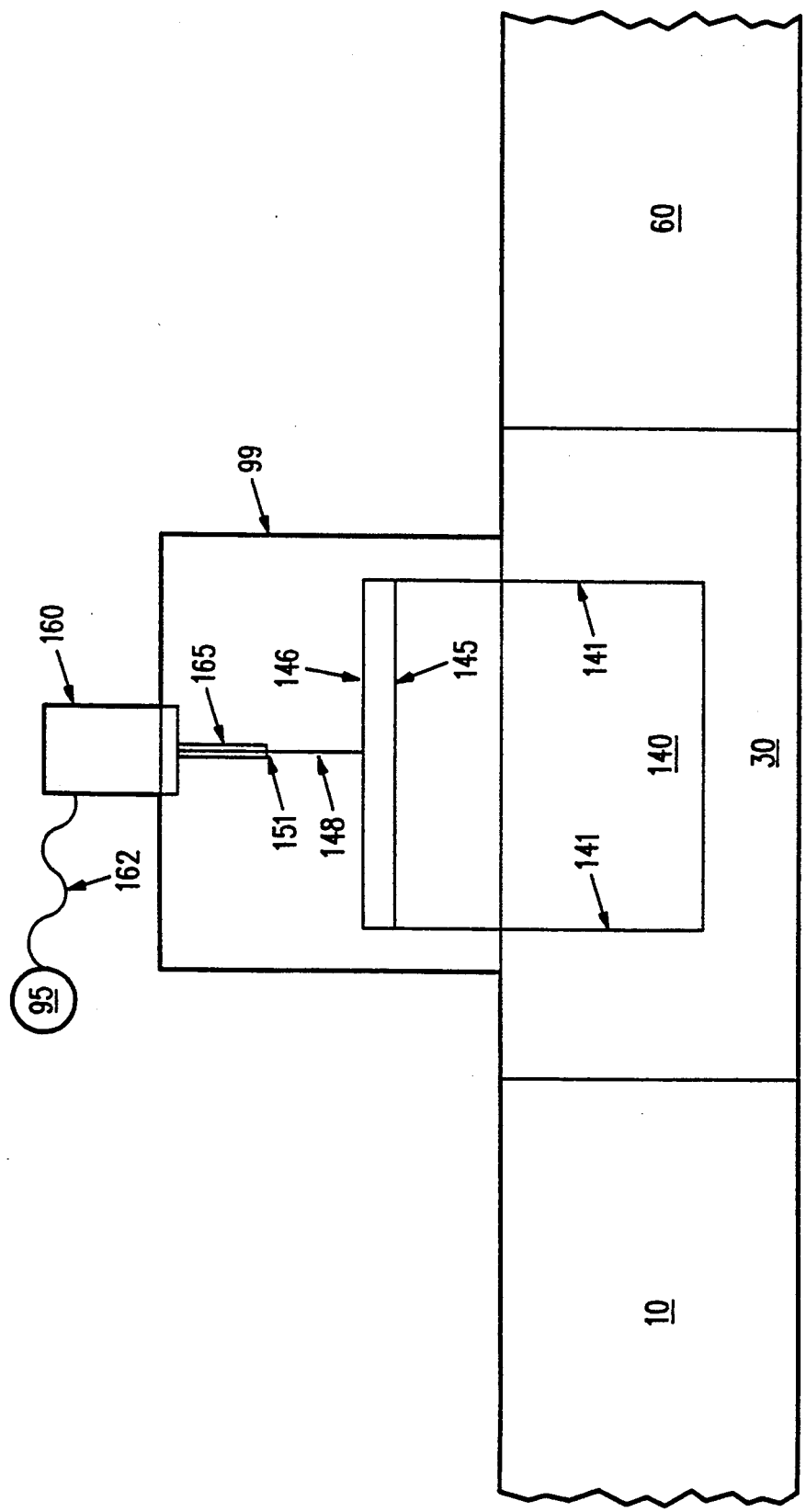

AUTOMATIC IN-FEED CONVEYOR SYSTEM FOR AN ICE INJECTOR SYSTEM

TECHNICAL FIELD

The present invention relates to the preparation of harvested produce for transportation to the marketplace and, more specifically, to the automation of icing equipment for chilling and preserving the harvested produce.

BACKGROUND ART

It is well known in the art to preserve harvested produce with ice for the period of time the produce is en route from the field to the marketplace. It is also well known that the quality of the produce when it arrives at the marketplace is affected by the speed with which it is chilled at the outset from field temperature to the desired transportation and holding temperature.

The first use of icing as a means of preservation involved placing ice in each shipping container or box as it was filled, or later at a central point as the containers were readied for loading on the transport vehicle. This laborious manual procedure has been supplanted by an automated procedure which is capable of icing more than one container at a time.

U.S. Pat. No. 4,484,448 to Crabb describes an ice injector which is capable of accepting pallets loaded with a plurality of containers of produce and injecting a slurry of ice and water into all containers simultaneously. The patent teaches that the ice injector may be loaded, operated and unloaded in a few minutes, saving time over the previous practice of manually icing individual containers one at a time.

In the present market, the consumer chooses produce using both quality and price criteria. The quality is directly affected by the rapidity with which the produce is received in the marketplace after harvesting. Price is affected to a great extent by the economy with which the numerous required actions between harvesting and presentation to the consumer are performed.

The ice injector disclosed in the patent referred to above operates at a speed determined by the slowest step in the action sequence. Typically, loading and unloading are done with a fork lift which loads and unloads one pallet at a time from the ice injector. The icing step occurs at a set time period determined by the number of containers on the pallet and the size of the containers. This step is relatively inflexible and cannot be speeded up without endangering the produce within the containers, hereafter referred to as boxes. The slowest steps in the sequence, and those most likely to be improved, are the in-feed operation and the unloading step.

The ice injector is provided with means to capture and recycle excess chilled water that drains from the boxes on the pallet. However, the pallet is not permitted to remain in the ice injector for more time than is necessary to inject the ice water slurry into the boxes on the pallet. Consequently, as the pallet is removed from the ice injector, excess chilled water is still draining from the boxes and is not captured for recycling because it spills onto the ground and goes to waste. Collection and reuse of the excess chilled water would provide economies in the cost of the water and the cost of chilling it, but permitting the pallet to dwell in the ice injector until drainage is complete would take too much time.

The present invention provides a way to expedite the loading and unloading activities so that the ice injector may be operated at peak efficiency in time and energy consumption and provide nearly 100% water recycling at the same time.

The present invention also allows the use of multiple-pallet handling equipment for simultaneously loading or unloading of more than one pallet, further enhancing the system operating efficiency.

DISCLOSURE OF INVENTION

The present invention addresses the operating efficiency of automatic icing devices such as that disclosed in U.S. Pat. No. 4,484,448 by decreasing the loading and unloading time, and by enhancing the efficiency with which excess chilled water is collected for reuse.

In one embodiment of the present invention, there are provided five cooperating elements which are combined with an ice injector. The first element is an in-feed conveyor that accepts a plurality of loaded pallets from a fork lift in a quantity that represents an adequate supply of pallets to the system. This provides enhanced in-feed operation so that no time is lost between unloading one pallet and loading the next into the ice injector.

The second element is a shuttle conveyor. The third element is an automated shuttle which conveys loaded pallets into and out of the ice injector. The shuttle operates independently of the fork lift and at a speed determined by the operating cycle of the ice injector. The shuttle conveyor receives loaded pallets from the in-feed conveyor as long as the supply lasts, and positions them for transfer to the automated shuttle. The shuttle conveyor also delivers iced pallets from the ice injector to the fourth element, a discharge conveyor. The shuttle conveyor is provided with a catch basin below it for collecting excess chilled water from the iced pallet while it is being removed from the ice injector.

The fourth element is a discharge conveyor that comprises an initial driven power section followed by dead rollers along which the iced pallets will move without assistance. In another embodiment the discharge conveyor may be a driven chain or belt conveyor, followed by dead rollers. Another catch basin is provided below the discharge conveyor for collecting more of the excess chilled water which continues to drain from the iced pallet.

The catch basins are connected to the fifth element which is a chilled water recovery system comprising a sump or chilled water reservoir and associated pump and piping. The chilled water recovery system returns the maximum amount of chilled water to the ice injector for reuse after it drains from the iced pallets. This enhanced collection efficiency allows the iced pallets to be expeditiously removed from the ice injector without slowing the icing cycle while excess chilled water is drained, collected, and returned to the ice injector.

The combination of enhanced in-feed, automated loading and unloading of the ice injector, and extended collection of excess chilled water drainage allows the ice injector to operate at peak efficiency of time and energy. This efficiency translates into improved product quality at time of arrival in the marketplace and reduced cost of the product.

BRIEF DESCRIPTION OF DRAWINGS

For a fuller understanding of the present invention, reference is made to the accompanying drawing in conjunction with the following detailed description of the preferred embodiment of the invention. In the drawing:

FIG. 5A is a plan view, partly broken away, of the chain drive feature of the in-feed conveyor shown in FIG. 2.

FIG. 5B is a side view of the chain drive shown in FIG. 5A.

FIG. 6 is a plan view of the shuttle that conveys loaded pallets into and out of the ice injector shown in FIGS. 1 and 3.

FIG. 7 is a side view of the shuttle shown in FIG. 6.

FIG. 15 is a plan view detail of the motive connection of the shuttle element of the present invention.

Figure 1:
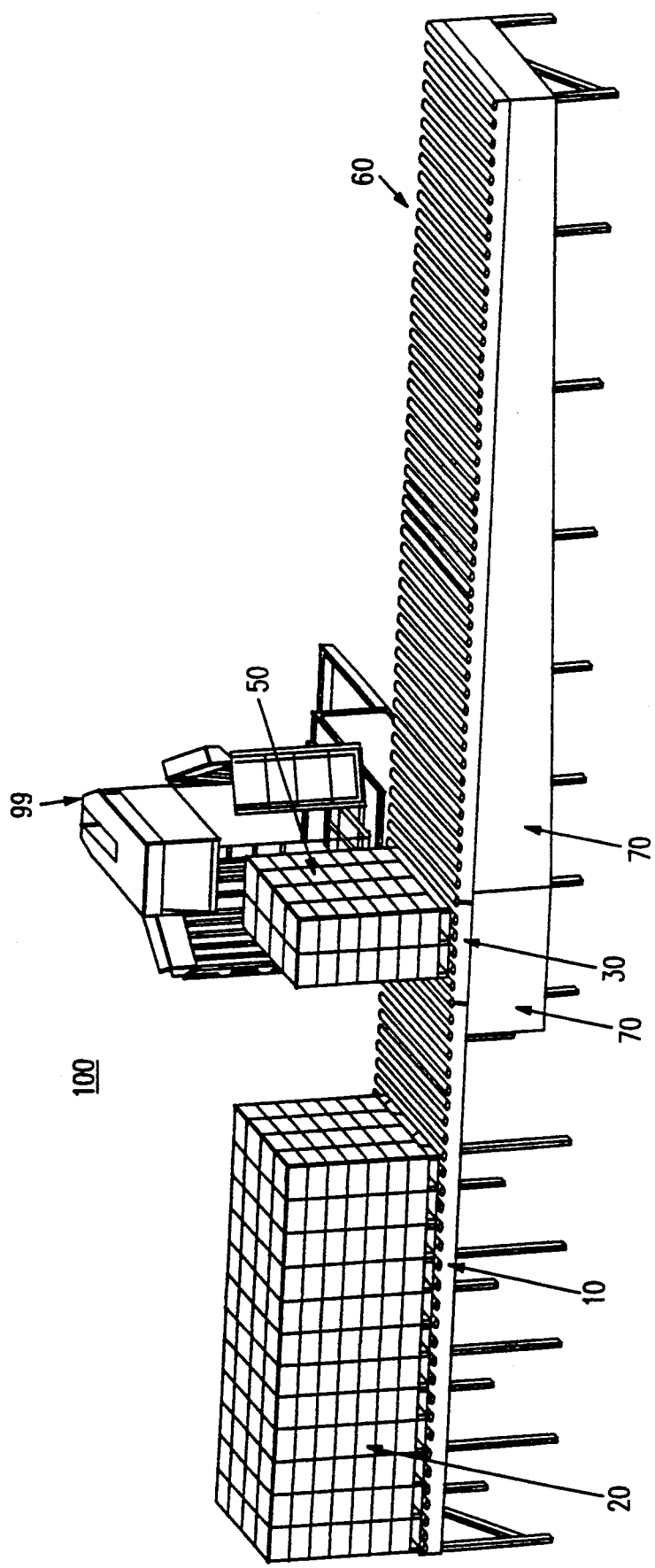
FIG. 1 is a perspective drawing of an ice injector improved with the automatic in-feed system of the present invention.

Reference numbers refer to the same or equivalent parts of the present invention throughout the several figures of the drawing.

BEST MODE OF CARRYING OUT THE INVENTION

Referring now to FIG. 1, the principal elements of an automatic in-feed system 100 of the present invention are shown assembled together and in association with an ice injector 99 such as that disclosed in U.S. Pat. No. 4,484,448. The automatic in-feed system 100 of the present invention may be adapted for use with any ice injector that is suitable for icing stacks containers, boxes or of cartons on a pallet. In the figure, an in-feed conveyor 10 has a load of cartons 20 disposed thereon in position for system operation. A shuttle conveyor 30 holds a single stack 50 of cartons on a pallet in preparation for loading them into the ice injector 99. A chilled water recovery system catch basin 70 is formed of two interconnected basins, one disposed under the shuttle conveyor 30, hereafter designated 70A, and the other disposed under a discharge conveyor 60, hereafter designated 70B. The discharge conveyor 60 is shown without any load as may occur as the first stack of cartons is prepared for icing.

Figure 2:
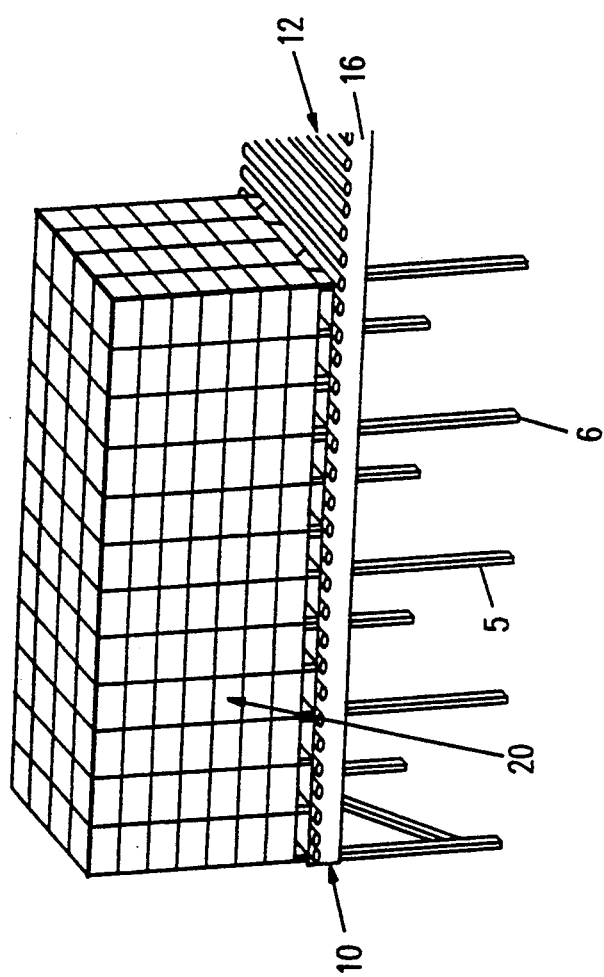
FIG. 2 is a perspective view of the in-feed conveyor of the automatic in-feed system of FIG. 1.

Referring now to FIG. 2, the in-feed conveyor 10 is shown. The in-feed conveyor 10 comprises a series of rollers 12 mounted in a frame to form a level supporting surface in a manner well known in the art. The rollers 12 may be fabricated of stainless steel or carbon steel and may be coated with corrosion resistant materials, if desired. The rollers 12 are rotated by a chain drive 16 which is described more fully hereinbelow. In an alternative embodiment, rollers 12 may be replaced by a chain or belt conveyor system as is known in the art, powered in a similar manner.

The in-feed conveyor 10 is sturdily constructed of steel to accommodate the weight of loaded cartons 20 placed thereon. The automatic in-feed system 100 may be designed to be transportable, if desired, by adapting the in-feed conveyor 10 to be dismountable, and by limiting its length to accommodate a suitable number of pallets. It may be made long enough to accommodate thirty pallets, if desired. In some installations the in-feed conveyor 10 has been made to accommodate as few as ten pallets. For disassembly of the automatic in-feed system 100 to make it portable, a length suitable for 16 pallets may be found to be a good compromise. For permanent installations, the length of the in-feed conveyor 10 is determined by the geometry of the space available for the installation. In both cases the in-feed conveyor 10 should be no longer than the discharge conveyor 60, and preferably slightly shorter to provide a longer period to collect excess chilled water while the cartons 20 are over the discharge conveyor 60.

The in-feed conveyor 10 is provided with legs 5 that are sturdily constructed of steel, although wood or other materials may be utilized, if desired. The legs 5 are generally of equal length so that the in-feed conveyor 10 is level with the shuttle conveyor 30. At the bottom of the legs 5, there may be provided feet 6 that may be unadjustable as in a fixed installation, or that may be adjustable, if desired, for either fixed or transportable applications as described hereinbelow.

Figure 3:
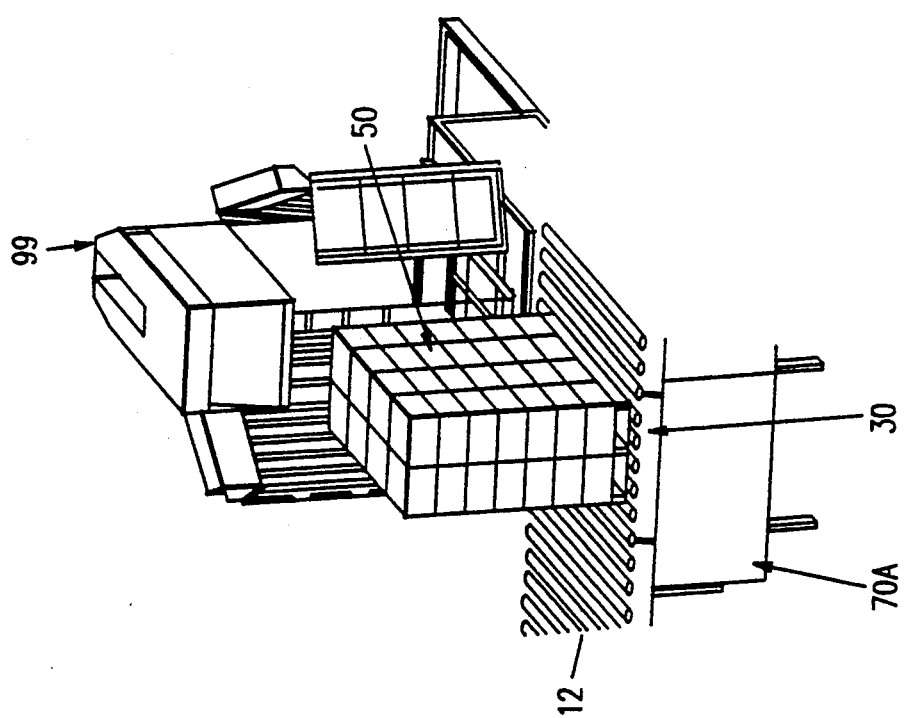
FIG. 3 is a perspective view of the shuttle conveyor of the automatic in-feed system of FIG. 1.

Referring now to FIG. 3, the shuttle conveyor 30 is shown. The shuttle conveyor 30 comprises rollers 12 which may be constructed as described hereinabove. Corrosion resistant materials are preferred so as to minimize corrosion of the apparatus by the draining excess chilled water and to facilitate the movement by a shuttle 140 of the loaded stack 50 into and out of the ice injector 99 as described hereinbelow in reference to FIGS. 6 and 15.

The ice injector 99 may be of any suitable type known in the art. Its design and operating features are described herein to illustrate the nature of the improvement thereto made by the present invention. For optimum improvement, the ice injector 99 should accept stacks of cartons, have a catch basin below it for collecting excess chilled water, or be adapted to have such a basin, and should recycle the captured excess chilled water for formation of ice slurry to be injected.

The ice injector 99 employed in the present embodiment is provided with doors that open to receive a pallet, and with a top clamp that is lowered onto the pallet. A timer controls the ice injection. The ice injector 99 is controlled by a programmable logic controller that receives input signals from various sensors as well as from adjustable timer switches and a radio-controlled switch similar to a garage door opener that can remotely turn the system ON and OFF. A schematic diagram of one such controller is shown in FIG. 14. The adjustable timer switches allow the operator to set the desired amount of ice injecting. The programmable logic controller, radio switch and timer switches are standard features of the ice injector 99. The automatic in-feed system 100 of the present invention utilizes the existing hydraulic power, and electronic and electrical controller of the ice injector 99, although independent hydraulic and electrical systems may be provided, if desired.

The ice injector 99 is provided with four sensors. These sensors are a SHUTTLE IN SENSOR that senses when the shuttle 140 is completely inside the ice injector 99; a DOOR OPEN sensor; a DOOR CLOSED SENSOR; and a TOP CLAMP SENSOR. The latter sensor is a proximity sensor located on the top clamp section of the ice injector 99 to sense when the top clamp has been fully lowered onto the pallet.

In a conventional icing operation as practiced heretofore a pallet is placed on a single sliding platform extending from the ice injector 99. The doors open and the pallet loaded with cartons is pulled into the interior of the ice injector 99. Once the doors close, a precisely controlled system circulates ice slurry into the cartons. In less than 30 seconds the doors open and the pallet automatically rolls out with approximately 1000 pounds of ice slurry now in its cartons. The pallet is then removed with a fork lift and another pallet is placed on the sliding platform. This conventional icing operation is suitable for icing 12,000 cartons per day. By employing the automatic in-feed system 100 of the present invention, the capacity can be increased to 25,000 cartons per day.

The shuttle conveyor 30 is provided with a catch basin 70A below it for collecting excess chilled water that drains from iced stacks 50 of cartons 20 when a stack 50 is removed from the ice injector 99 after ice is injected into the cartons. The chilled water catch basin 70A under the shuttle conveyor 30 may be of either flat bottom design or have a bottom shaped to drain to an outlet. The outlet is connected to the slurry-making portion of the ice injector 99. The chilled water recovery system is shown schematically in FIG. 13.

Figure 13:
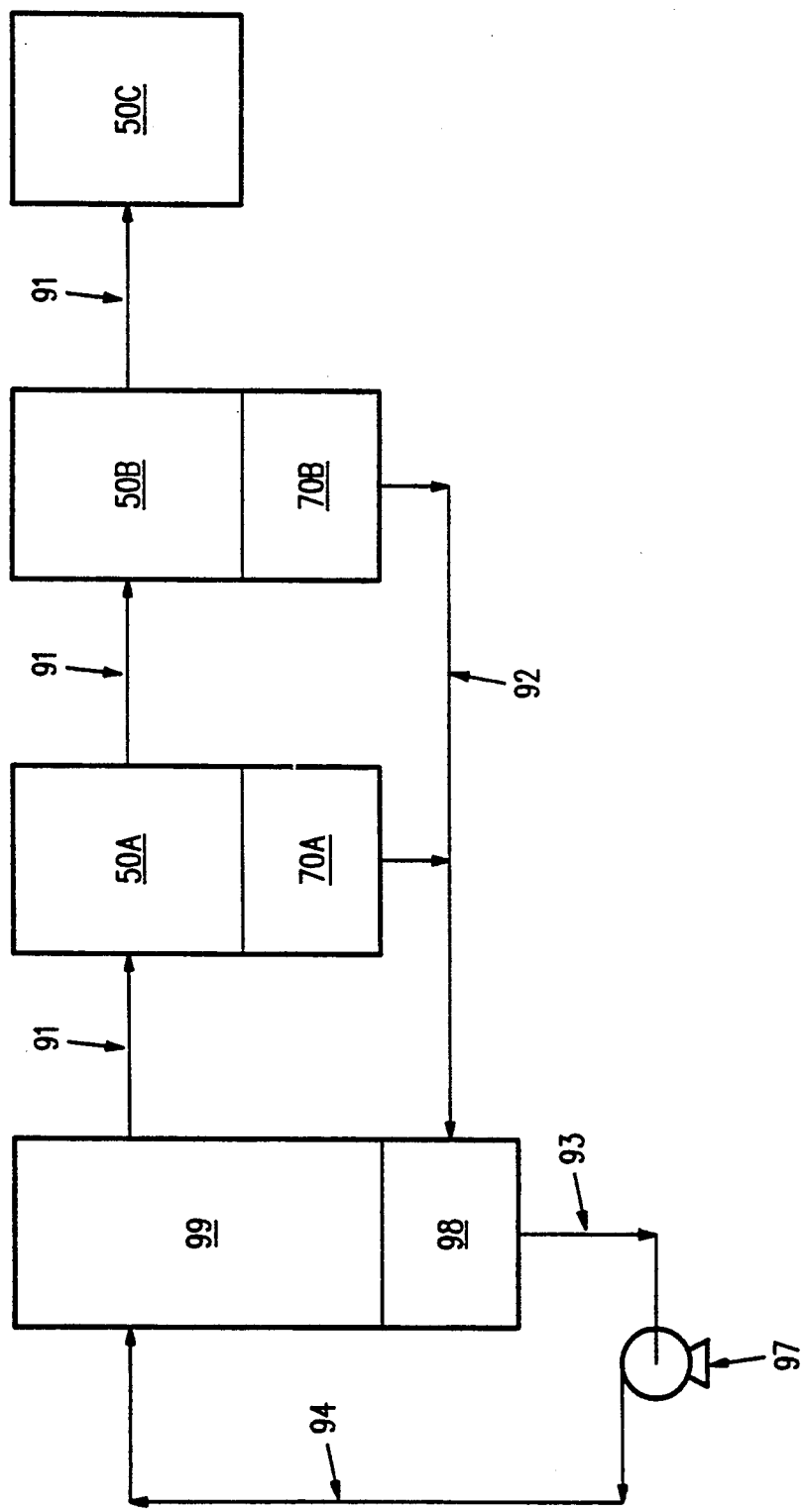
FIG. 13 is a schematic diagram of the chilled water collection element of the present invention.
Figure 14A:
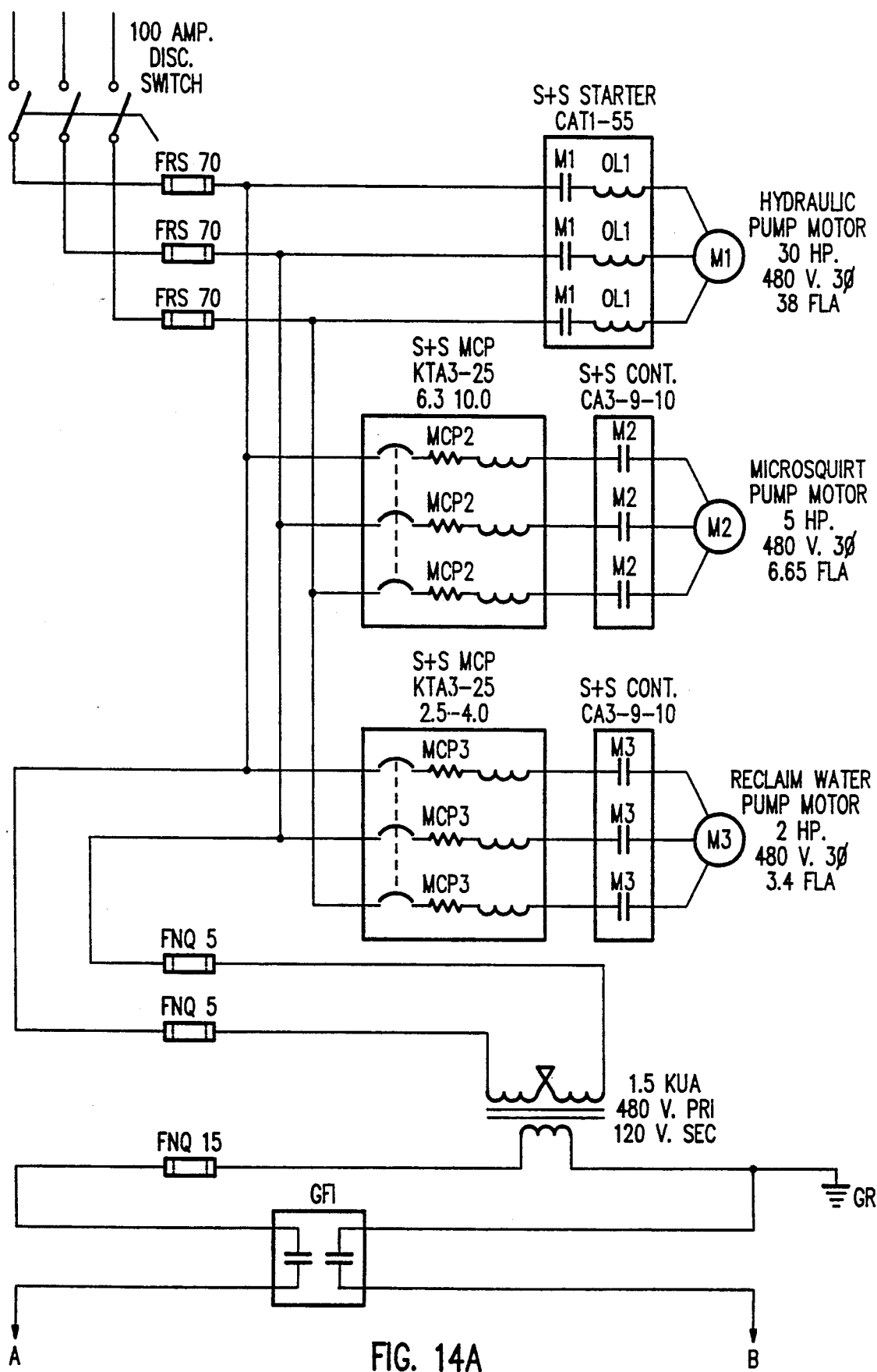
FIGS. 14A–14E are a schematic diagram of the control circuitry of the present invention.
Figure 14B:
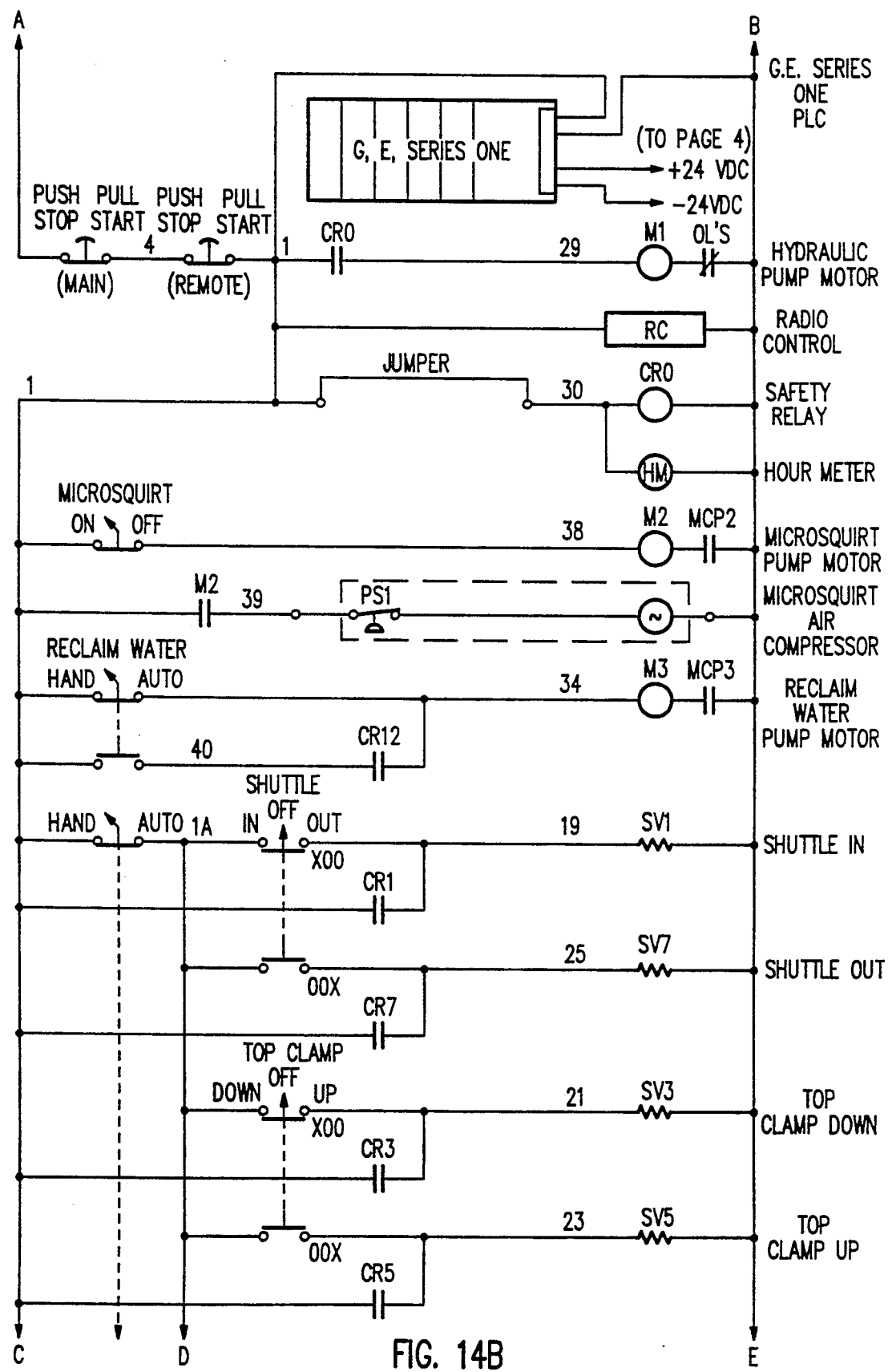
Figure 14C:
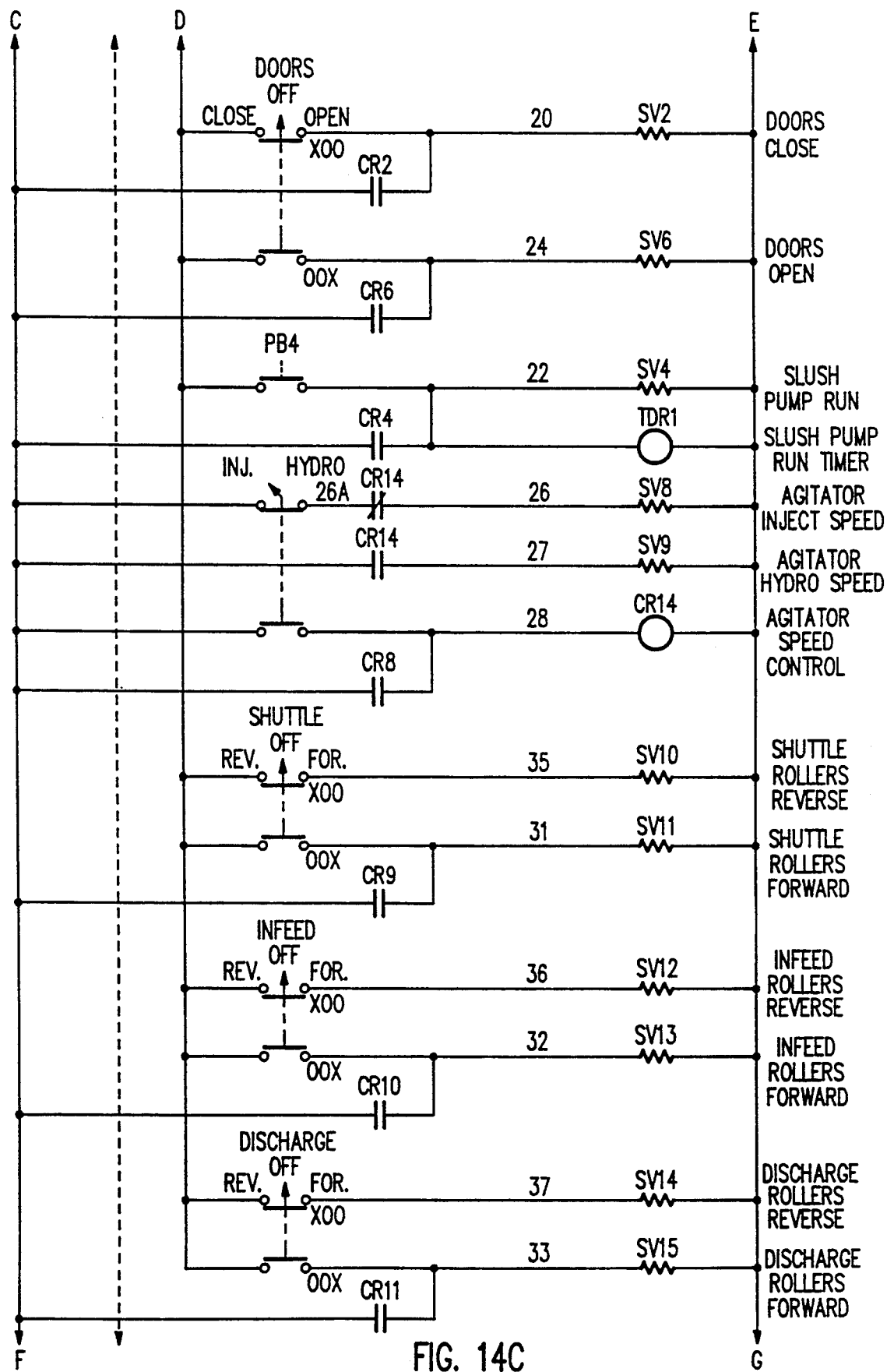
Figure 14D:
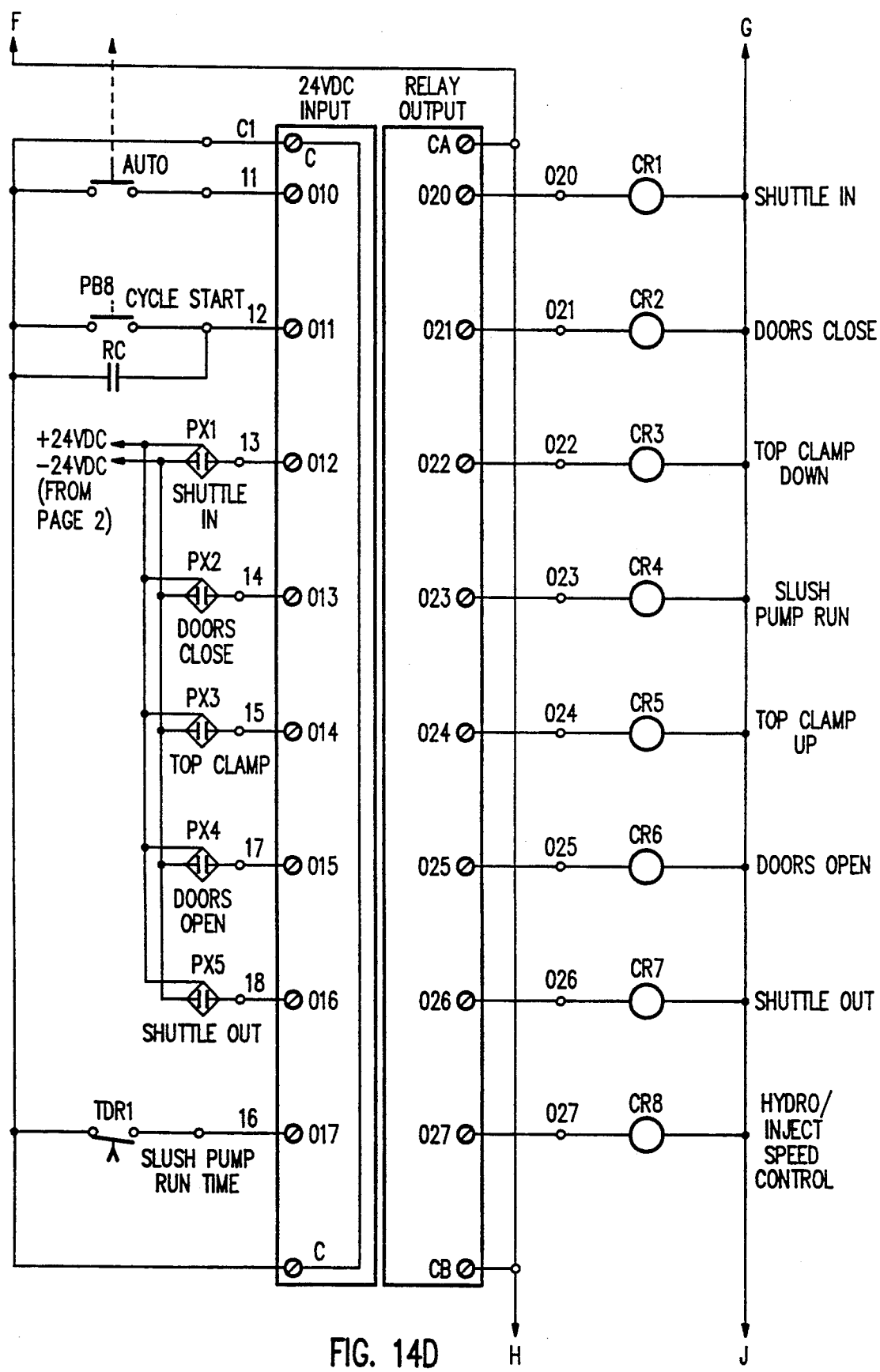
Figure 14E:
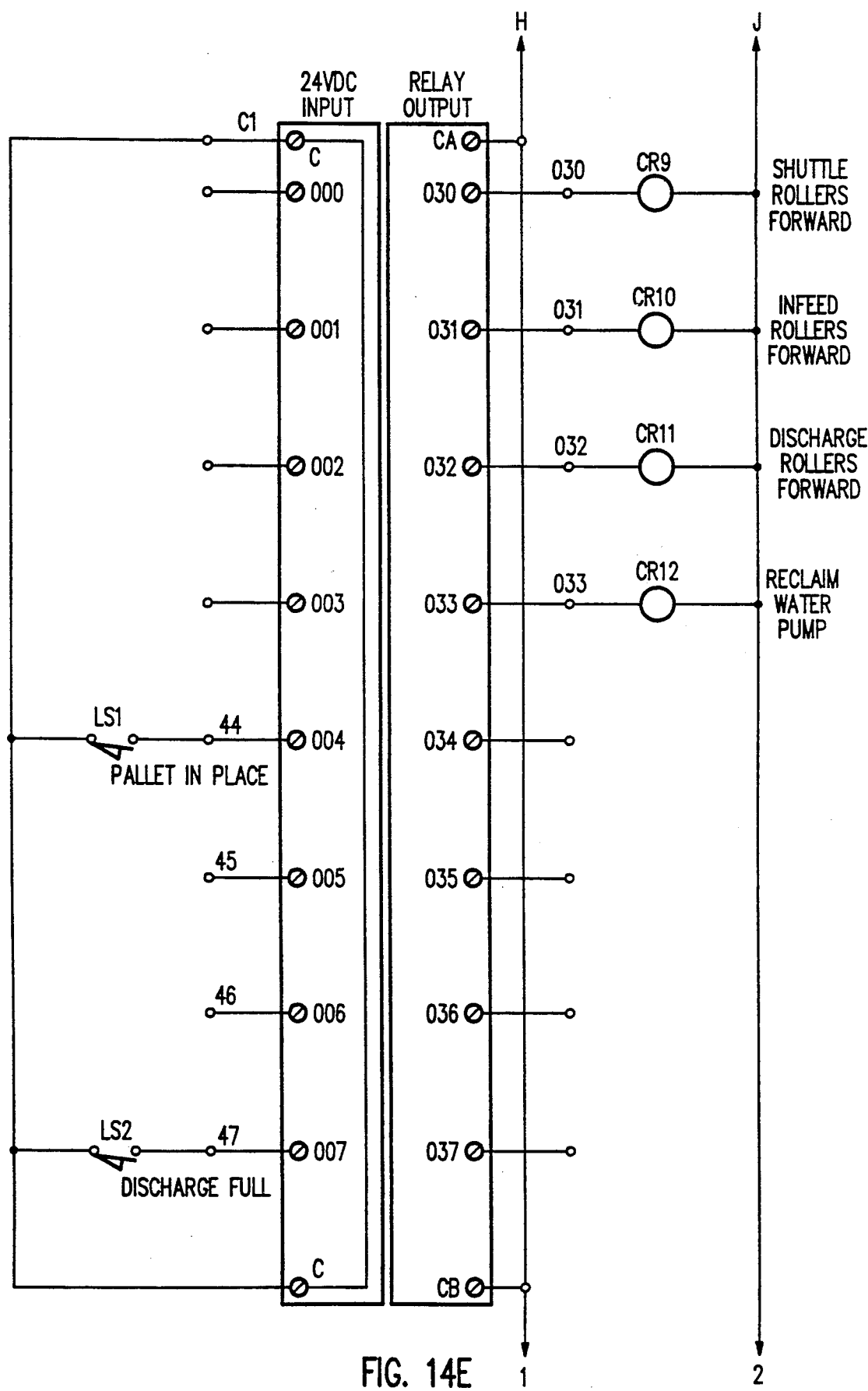

Referring now to FIG. 13, the chilled water recovery system is described. The chilled water recovery system comprises the excess chilled water catch basins 70A and 70B, a sump or chilled water reservoir 98, a pumping system 97 connected to the sump that pumps chilled water 93 back into the system, and interconnecting hose or piping 92 of a suitable diameter. Typically, piping 92 is made of polyvinyl chloride (PVC) and is of $1\frac{1}{2}$ to $2\frac{1}{2}$ inches in diameter. The chilled water recovery system returns the maximum amount of chilled water 93 to the ice injector 99 for reuse after it drains from the iced pallets. This enhanced collection efficiency allows the iced pallets to be expeditiously removed from the ice injector 99 without slowing the icing cycle while excess chilled water is drained, collected and returned to the ice injector 99.

Figure 4:
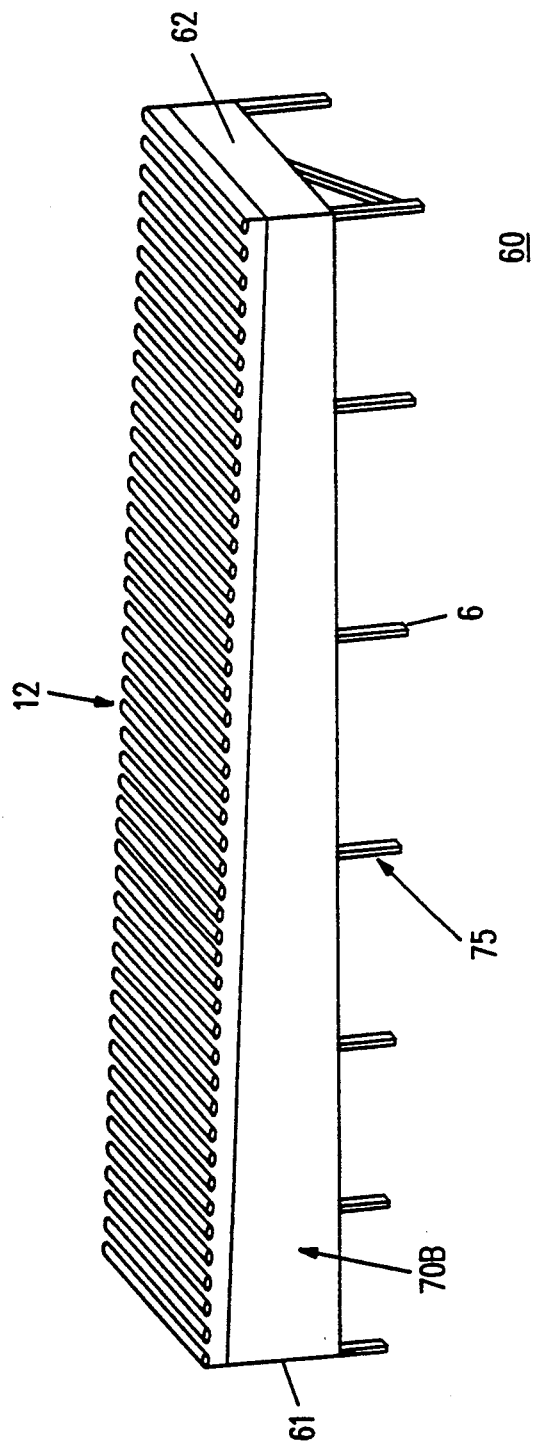
FIG. 4 is a perspective view of the discharge conveyor of the automatic in-feed system of FIG. 1.

Referring now to FIG. 4, the discharge conveyor 60 is shown. The discharge conveyor 60 comprises rollers 12 as described hereinabove, mounted so as to form a generally level surface with one end 61 disposed at the shuttle conveyor 30 and with the other end 62 disposed at a location convenient for off loading of the stacks of iced cartons. In some applications the height of the discharge conveyor 60 may be determined by the height of the vehicle into which the stacks are to be loaded, for example, as in trucks equipped with internal rollers for manual loading and unloading of the cargo.

The discharge conveyor 60 comprises an initial driven section in which the rollers 12 are motor driven. The driven section is followed by dead rollers 12 along which the iced pallets easily roll when pushed. The first pallet onto the discharge conveyor 60 is driven onto the dead rollers 12 and stops. The second pallet shoves the first pallet further along the dead rollers 12 and stops. The third pallet shoves the first and second pallets along the dead rollers 12 and stops, and so on and so forth. In a second embodiment, a gravity roller conveyor bed may be employed, if desired. In this embodiment, iced pallets from the shuttle conveyor 30 push the preceding pallets down the gravity roller bed.

A third embodiment of the present invention may be constructed utilizing a fully-driven conveyor of the type illustrated by the in-feed conveyor 10 in place of the discharge conveyor 60 having dead rollers. In all other particulars, this embodiment is the same as described herein in reference to the preferred embodiment.

A fourth embodiment of the present invention may be constructed utilizing a driven chain or belt conveyor in a manner similar to the driven roller conveyor described herein above. In all other particulars, this embodiment is the same as described herein in reference to the preferred embodiment.

The discharge conveyor 60 is sturdily constructed of steel as are the other elements. In some applications, fixed installations for example, it may be desirable to construct legs 75 of wood or other materials rather than of steel. In transportable applications the legs 75 would preferably be equipped with adjustable feet 6 as described hereinbefore.

Another catch basin 70B is provided below the discharge conveyor 60 for collecting more of the excess chilled water which continues to drain from the iced pallets as they intermittently move along the discharge conveyor 60.

The chilled water catch basin 70B may be of either flat bottom design or have a bottom shaped to drain to an outlet. The outlet is connected by the chilled water recovery system to the slurry making portion of the ice injector 99 by either hose or piping either directly or by connection to the other chilled water catch basin 70A that is disposed below the shuttle conveyor 30.

The chilled water catch basins 70A and 70b extend the chilled water recovery time beyond that provided by the internal tank of the ice injector 99, allowing the drainage time within the ice injector 99 to be minimized without sacrificing collected water volume. If the chilled water catch basin 70B extends to the distal end 62 of the discharge conveyor 60, essentially all water that drains from the iced cartons prior to off-loading into the cold storage area or into transportation vehicles will be recovered for reuse. Minimizing the collection time within the ice injector 99 allows the ice injector 99 to be operated as quickly as its design allows.

Referring now to FIGS. 5A and 5B, the chain drive 16 for the rollers 12 is shown. A roller chain 15 is rigged in a series of overlapping small loops in a manner well known in the art. The roller chain 15 loops over a double sprocket 19 attached to a shaft 18 of the roller 12 and is moved in the direction indicated by the arrows 17 by any convenient motive apparatus, such as an electric or hydraulic motor, not shown. The roller chain 15 engages teeth that are provided on the end of the shaft 18, turning the rollers 12 in unison. The rotation of the rollers 12 moves loaded pallets into the proper position to be acted upon by the shuttle conveyor 30. A similar configuration is utilized to rotate the driven rollers, chain or belt of the discharge conveyor.

Referring now to FIGS. 6 and 7, the shuttle 140 of the shuttle conveyor 30 is shown. FIG. 6 is a plan view, and FIG. 7 is an elevation view. The shuttle 140 is an open framework apparatus, typically constructed of stainless steel, and all joints are securely fabricated as by welding. The shuttle 140 is dimensioned to fit between the rollers 12 of the shuttle conveyor 30 and to support a single pallet loaded with cartons 20. In operation, the shuttle 140 is moved in a direction transverse to the longitudinal direction of the conveyors 10, 30, 60 to transfer the loaded pallet into and out of the ice injector 99. In some applications, such as one in which the ice injector 99 can accommodate larger loads such as two pallets simultaneously, the shuttle 140 may be wider to accommodate the larger load.

The shuttle 140 has two sides 141 that are securely attached to two ends 143, 145. The sides 141 may be of any cross-sectional shape which provides adequate strength, such as box, I-beam or round, either tubular or solid. One end 143 is typically formed of angular or L shaped cross section so that a portion, such as a first lip 144, protrudes above the top surface 142 and of the sides 141. The first lip 144 serves as a stop to engage the side of the pallet as the pallet is moved into or out of the ice injector 99. The other end 145 is similarly constructed with a second lip 150 that is disposed opposite to the first lip 144 that was previously described, so that either lip 144 or 150 can engage a loaded pallet as the shuttle 140 is moved back and forth.

The shuttle 140 is provided with extensions 147 that are securely attached to either end of the inner end 145 of the shuttle 140 so as to accommodate parallel end member 146 and a coupling 148 for attaching the shuttle 140 to a motive source, such as a hydraulic piston as described hereinbelow in reference to FIG. 15. The coupling 148 has an aperture 151 therethrough so as to accommodate such attachment. The aperture 151 may be di'.posed either in the horizontal plane as indicated at 151 in FIG. 6 or in the vertical plane as indicated at 151A in FIG. 7.

The parallel end member 146 serves as a stabilizer for the coupling 148 to prevent lateral motion thereof as the shuttle 140 is driven back and forth under load. Corner braces 149 are provided to further strengthen the shuttle 140 so that distortion and bending of the shuttle 140 is minimized. The shuttle 140 is placed in position in front of the ice injector 99 and is connected at the coupling 148 to a linear actuator which may be an electrical or hydraulic linear device such as a lead screw or a piston.

Referring now to FIG. 15, the operation of the linear actuator is described. In the preferred embodiment, a hydraulic cylinder 160 is attached to ice injector 99 near the bottom at a level equal to the shuttle conveyor 30. Cylinder 160 is powered by hydraulic power unit 95 of ice injector 99 through suitable hydraulic connecting hoses 162. In response to commands from the controller of ice injector 99, cylinder 160 extends or retracts shaft 165. The shaft 165 is connected to coupling 148 of shuttle 140 at aperture 151. When the shaft 165 is extended, shuttle 140 is moved out of ice injector 99. When the shaft 165 is retracted, shuttle 140 is drawn into ice injector 99.

A second embodiment suitable for use with an ice injector which utilizes electrical motors rather than hydraulic motors is formed by replacing hydraulic cylinder 160 with a reversible electric motor and hydraulic shaft 165 with a worm drive gear train or lead screw. The movement of the shuttle 140 in this embodiment is as described hereinabove.

Figure 8:
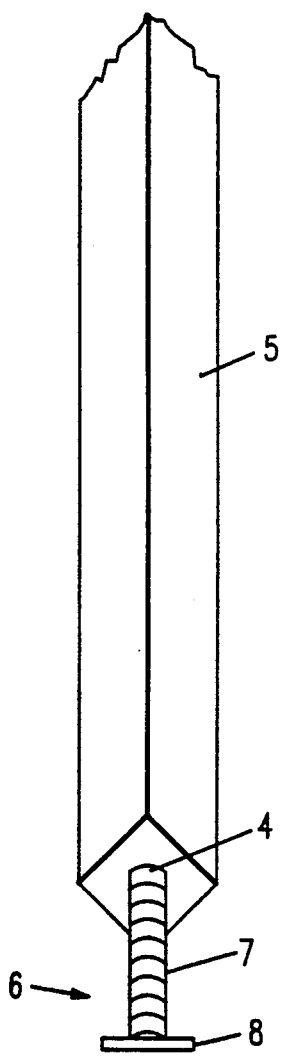
FIG. 8 is a detail of the foot construction for the legs of the conveyors shown in FIG. 1.

Referring now to FIG. 8, there is shown one of the adjustable feet 6 for terminating the legs 5. The leg 5 is bored longitudinally with a blind hole 4 which is threaded to accommodate a shaft 7. Alternatively, threads may be provided by a threaded insert as is known in the art. The shaft 7 is terminated in a pad 8. The pad 8 contacts the ground or other supporting surface upon which the leg 5 stands. To adjust the height of the leg 5 above the supporting surface, the shaft 7 is rotated either manually or by an attached power source such as a motor, not shown, thus lowering or raising the pad 8. The feet 6 may be constructed to operate under hydraulic pressure if desired. In this instance, the blind hole 4 accommodates a hydraulic cylinder for extending or retracting an unthreaded shaft 7 as is known in the art.

Figure 9:
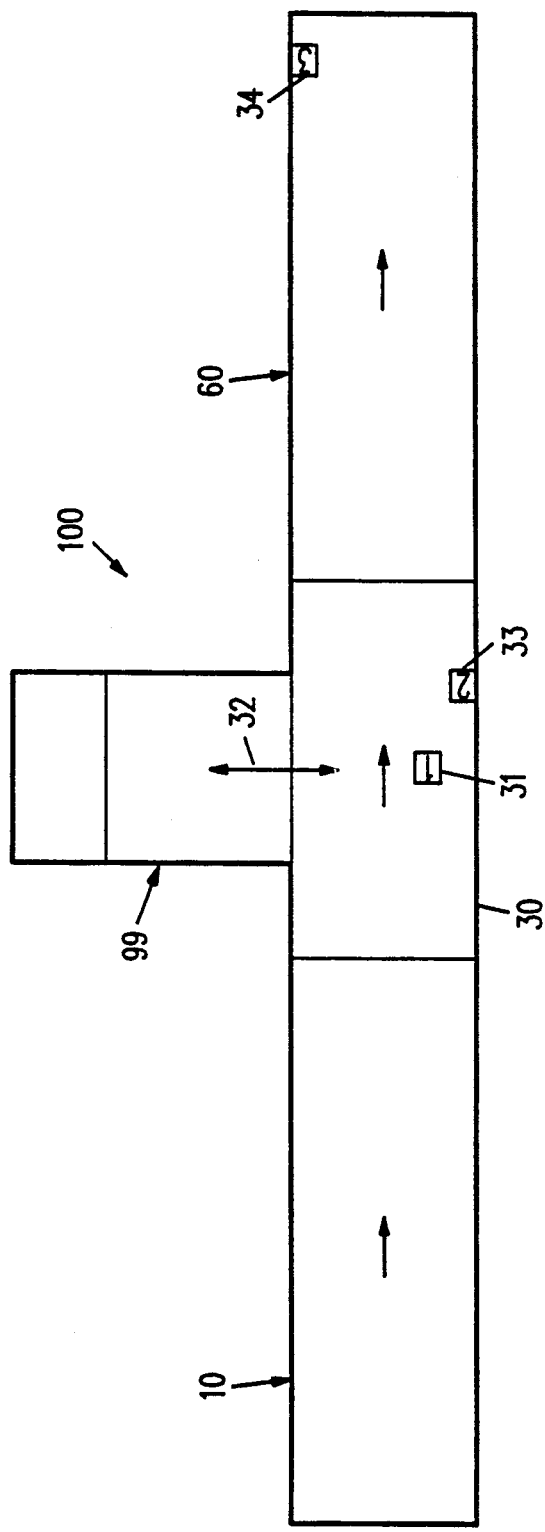
FIG. 9 is a plan view of the automatic in-feed system of the present invention showing the association of the principal elements and the automated control sensors.

Referring now to FIG. 9, the positioning of the system control sensors that provide for automatic operation of the system is shown in association with the principal elements of the automatic in-feed system 100 of the present invention. The shuttle conveyor 30 is positioned in front of the ice injector 99 with the in-feed conveyor 10 on one side, typically the left side, and with the discharge conveyor 60 on the opposite side.

The automatic in-feed system 100 is provided with three sensors that provide signals to the programmable logic controller of the ice injector 99. The first is a SHUTTLE OUT sensor 31. It is a proximity sensor and is located in front of the ice injector 99. The SHUTTLE OUT sensor 31 senses when the shuttle 140 is completely out of the ice injector 99 and ready for discharge and acceptance of a pallet. The shuttle 140 is not shown in FIG. 9 but its transverse in and out motion is indicated by a double-ended arrow 32.

The second sensor is a LOADED SHUTTLE sensor 33. It is disposed on the opposite side of the shuttle conveyor 30 from the ice injector 99, and is aligned with the downstream edge of the ice injector 99. The second sensor 33 is a mechanical limit switch that senses when a pallet is properly positioned in the shuttle 140. This mechanical limit switch also acts to reset the logic of the programmable logic controller to automatically "feed" the next pallet into the shuttle 140.

The third sensor is a FULL DISCHARGE CONVEYOR sensor 34. It is disposed at the distal end of the discharge conveyor 60. The third sensor 34 is also a mechanical limit switch. It senses when the discharge conveyor 60 is full of iced pallets and cannot accept any more. This mechanical limit switch is used as an automatic shut-off to stop the system from icing more pallets until the discharge conveyor 60 is able to accept more iced pallets.

It should be understood that many variations are possible. The sensors 31, 33, 34 may be of any other type of sensor which detects the presence or absence of an object such as a loaded pallet. For example, the three sensors 31, 33, 34 provided in the automatic in-feed system 100 may be implemented as mechanical limit switches, photo electric sensors, or inductive or capacitive proximity sensors, if desired.

In operation, pallets are loaded with cartons filled with produce in the field. The loaded pallets are transported to the icing station to be prepared for transportation to market. A fork lift operator transfers the loaded pallets onto the in-feed conveyor 10 as they arrive from the field. Typically, a single field vehicle can carry sufficient pallets to fill the in-feed conveyor 10, although more than one truck may arrive for unloading at the same time. In this case, several forklift operators may set the pallets on the ground, while another forklift operator transfers the pallets from the ground to the in-feed conveyor 10. If desired, a multiple; pallet forklift may be used. Such multiple; pallet forklifts typically can move 10 or 12 pallets at a time. The use of a multiple-pallet forklift increases the pallet handling efficiency. The in-feed conveyor 10 then moves the loaded pallets into position for icing.

MODE OF AUTOMATIC OPERATION

1. Pallets are placed on the in-feed conveyor 10.

2. A START button is pushed and starts the in-feed conveyor 10, shuttle conveyor 30 and discharge conveyor 60.

3. The pallets travel down the in-feed conveyor 10 and the first pallet is transferred to the shuttle conveyor 30. At this time, a gap is created between the first and second pallets due to an increase in speed of the shuttle conveyor 30 as compared to the in-feed conveyor 10.

4. The first pallet travels into the shuttle 140 and actuates the LOADED SHUTTLE SENSOR 33. The in-feed and shuttle conveyors 10, 30 are stopped at this time.

5. The shuttle 140 pulls the pallet into the ice injector 99 and stops when the SHUTTLE IN SENSOR is actuated.

6. The ice injector top clamp is lowered onto the pallet. The TOP CLAMP SENSOR is actuated when the top clamp is fully lowered onto the pallet.

7. Once the TOP CLAMP SENSOR is actuated, the doors close and actuate the CLOSED DOOR SENSOR.

8. When the CLOSED DOOR SENSOR is actuated, the ice injector 99 begins injecting ice for a predetermined time.

9. When the icing time is completed, the doors of the ice injector 99 open until the OPEN DOOR SENSOR is actuated.

10. The top clamp is raised off of the top of the iced pallet.

11. The shuttle 140 pushes the iced pallet out of the ice injector 99 and onto the shuttle conveyor 30 until the SHUTTLE OUT SENSOR 31 on the shuttle conveyor 30 is actuated. At this time, the LOADED SHUTTLE SENSOR 33 is actuated by the pallet and starts a time delay sequence. The time delay sequence provides enough time for the iced pallet to pass by the LOADED SHUTTLE SENSOR 33 before the LOADED SHUTTLE SENSOR 33 is reset to stop the next pallet.

12. All of the conveyors 10, 30, 60 start to drive. The iced pallets is transferred onto the discharge conveyor 60.

Referring to FIG. 14, the electrical schematic of a controller suitable for performing the above steps is shown. This controller is of a type common in the art and is included herein to fully represent the method of execution of the preferred embodiment.

13. Steps 3-12 are repeated.

Referring again to FIG. 17, drainage of the excess water from the cartons 20 containing the ice-water slurry occurs while the pallet of iced cartons is moved out of the ice injector 99 and while the pallet of iced cartons 20 moves intermittently down the discharge conveyor 60. The iced cartons 20A on shuttle conveyor 30 drain into basin 70A as described hereinabove. The iced cartons 50B on discharge conveyor 60 drain into basin 70B. The pallet of drained cartons 20C is then removed for transportation or storage. The chilled water is returned to the ice injector 99 by the chilled water recovery system for reuse as described hereinabove.

Figure 10:
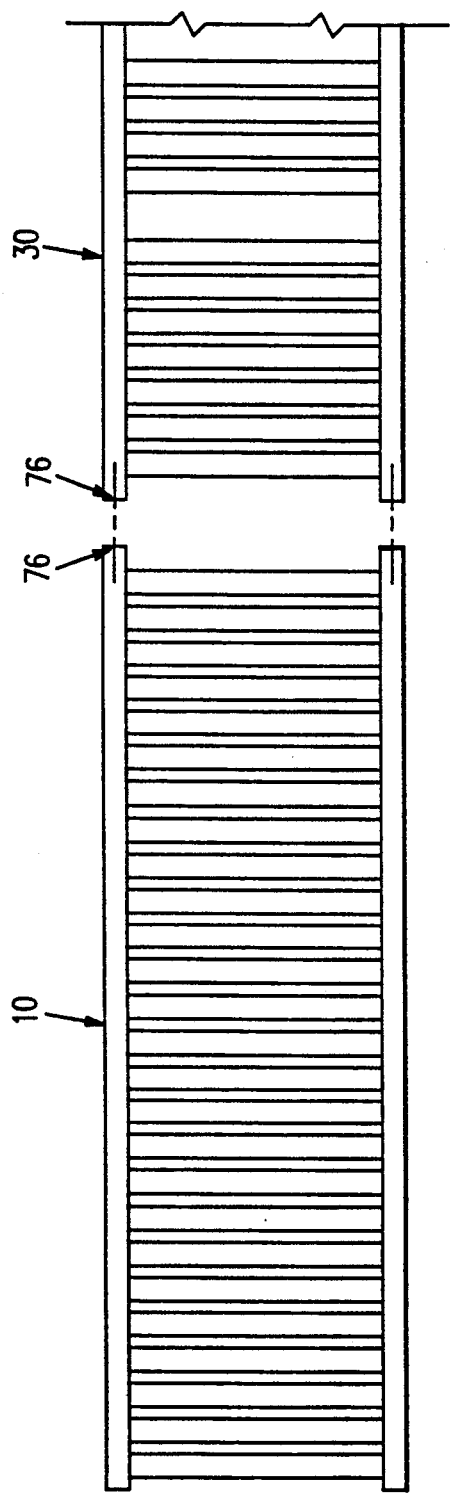
FIG. 10 is a top view showing the bolt-together connection of an in-feed conveyor to a shuttle conveyor.
Figure 11:
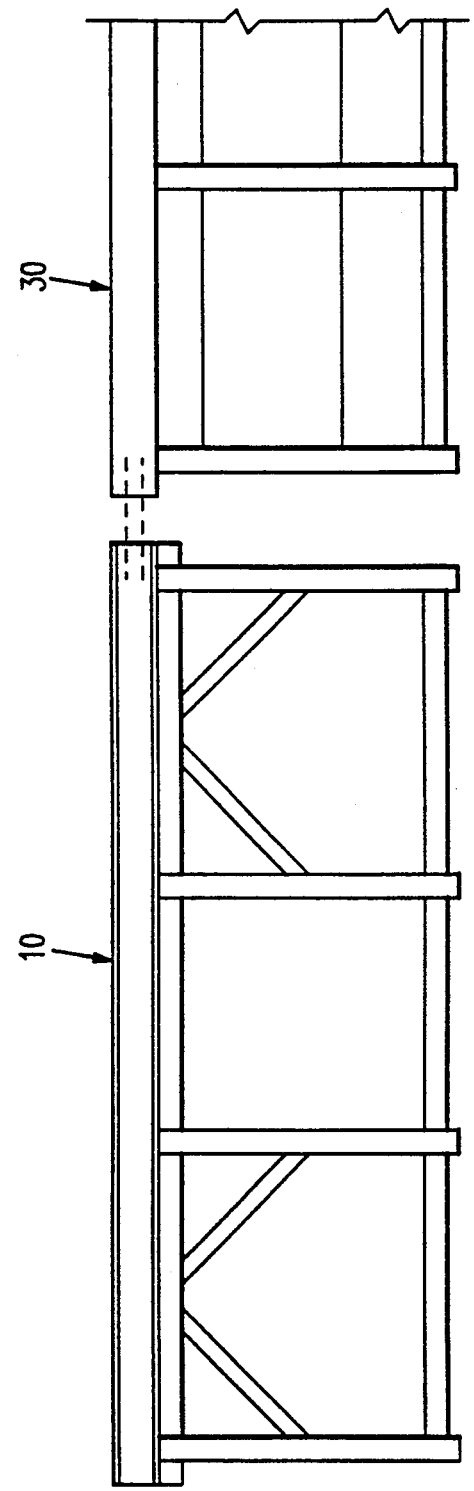
FIG. 11 is a side view of the connection of the conveyors shown in FIG. 10.
Figure 12:
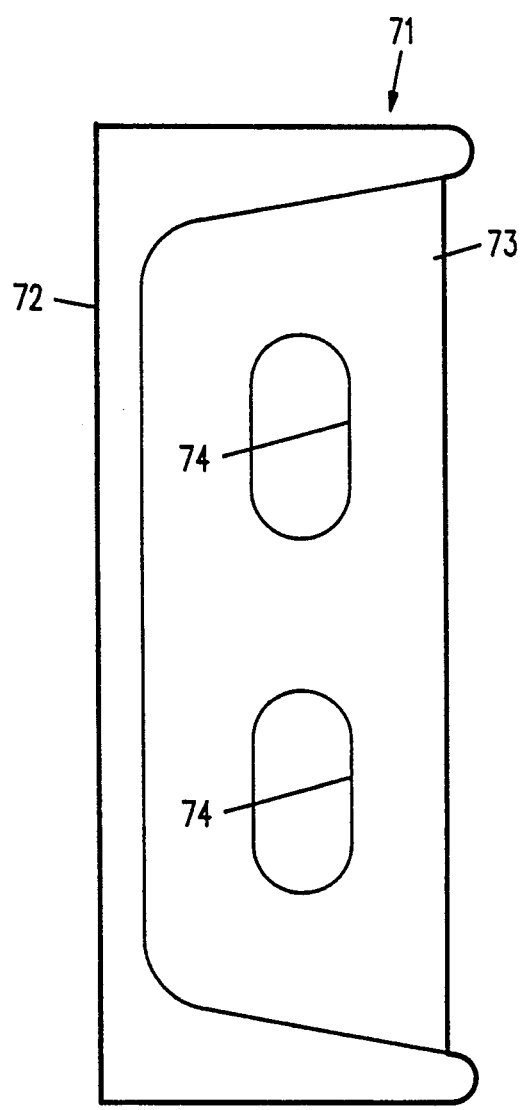
FIG. 12 is a drawing of a structural member used in the assembly of the automatic in-feed system of the present invention.

Referring now to FIGS. 10 and 11, there is shown a typical conveyor connection. FIG. 10 is a top view and FIG. 11 is a side view. Connection of the in-feed conveyor 10 to the shuttle conveyor 30 is shown. Typically, the conveyors 10, 30 are butted together, as at 76, and they then are fastened with suitable fasteners such as bolts, or the like. Referring to FIG. 12, a structural member comprising a butt-type coupling 71 is shown. FIG. 12 shows an end view of one rail 72 of a conveyor. The rail 72 has a U-channel shape for rigidity. The butt-type coupling 71 comprises the rail 72, a metal webbing 73 that is fastened into the hollow portion of the rail 72, as by welding, and holes 74 through which bolts (not shown) may be inserted.

An efficiency provided by the present invention over the typical non-automated systems common in the art occurs in the movements of the fork lift operator. Heretofore, the operator moved sequentially from the field vehicle to the ice injector 99, then on to the transport vehicle or into the cold storage area, returning to the field vehicle. The present invention allows the fork lift operator to completely unload the field vehicle, using a single or multiple pallet forklift while the ice injector 99 is automatically charged and emptied with the loaded pallets. After the field vehicle is unloaded, the fork lift operator moves to the off-load side of the discharge conveyor 60 and transfers the iced pallets to the cold storage area or to the transport vehicle. This concentration of activity around each vehicle reduces the overall handling time required.

A major advantage of the automatic in-feed system 100 of the present invention is that it does a much better job of recovering the draining chilled water than was done heretofore. This reduces the amount of water required by the system which is especially important in times of water scarcity. Furthermore, it saves ice. If the water in the system has to be replenished with 60 degree well water, more energy is needed to chill the water to the required temperature. It has been found that the system of the present invention provides at least a 90% reduction of water use and an 8 to 10% reduction of ice use.

The present invention has been particularly shown and described with respect to certain preferred embodiments thereof. However, it should be readily apparent to those of ordinary skill in the art that various changes and modifications in form and details may be made without departing from the spirit and scope of the invention as set forth in the appended claims.

We claim:

1. An automatic in-feed system for use with an ice injector comprising:

an in-feed conveyor for simultaneously receiving a plurality of on-loaded pallets carrying boxes of produce and for conveying said pallets longitudinally;

a shuttle conveyor disposed adjacent said in-feed conveyor for receiving pallets therefrom and for conveying said pallets longitudinally;

an ice injector disposed adjacent said shuttle conveyor and adapted to receive said pallets and to inject an ice slurry into said boxes of produce;

a shuttle that moves in a direction generally transverse to the longitudinal direction of said conveyors for transferring each of said pallets from said shuttle conveyor to said ice injector and back again after the ice slurry has been injected into said boxes of produce;

a discharge conveyor disposed adjacent said shuttle conveyor and adapted to receive and collect a plurality of said pallets for simultaneous removal therefrom; and a chilled water recovery system including catch basins disposed below said shuttle conveyor and said discharge conveyor for recovering spilled chilled water and recycling said chilled water to said ice injector.

2. An automatic in-feed system for use with an ice injector comprising:

an in-feed conveyor for receiving on-loaded pallets carrying boxes of produce and for conveying said pallets longitudinally;

a shuttle conveyor disposed adjacent said in-feed conveyor for receiving pallets therefrom and for conveying said pallets longitudinally;

an ice injector disposed adjacent said shuttle conveyor and adapted to receive said pallets and to inject an ice slurry into said boxes of produce;

a shuttle that moves in a direction generally transverse to the longitudinal direction of said conveyors for transferring said pallets from said shuttle conveyor to said ice injector and back again after the ice slurry has been injected into said boxes of produce; and a discharge conveyor disposed adjacent said shuttle conveyor and adapted to receive said pallets therefrom.

3. Said automatic in-feed system of claim 2 further comprising:

a chilled water recovery system including catch basins disposed below said shuttle conveyor and said discharge conveyor for recovering spilled chilled water and recycling said chilled water to said ice injector.

4. An automatic in-feed system comprising:

a first conveyor for receiving a plurality of on-loaded pallets carrying boxes of produce and for conveying said pallets longitudinally;

a second conveyor disposed adjacent said first conveyor for receiving pallets therefrom and for conveying said pallets longitudinally;

ice injection means disposed adjacent said second conveyor means and adapted to receive said pallets and to inject an ice slurry into said boxes of produce;

shuttle means for individually transferring each of said pallets transversely from said second conveyor to said ice injection means and back again after the ice slurry has been injected into said boxes of produce; and a third conveyor disposed adjacent said second conveyor and adapted to receive said pallets therefrom.

5. An automatic in-feed system as in claim 4 further comprising:

a chilled water recovery system including catch basins disposed below said second and third conveyors for recovering spilled chilled water and recycling said chilled water to said ice injection means.

6. An automatic icing system comprising:

first conveyor means for receiving on-loaded containers and for conveying said containers longitudinally;

second conveyor means disposed adjacent said first conveyor means for receiving containers therefrom and for conveying said containers longitudinally;

ice injection means disposed adjacent said second conveyor means and adapted to receive said containers and to inject therein an ice slurry; and means for transferring said containers from said second conveyor means to said ice injection means and back again after the ice slurry has been injected therein.

7. An automatic icing system as in claim 6 further comprising:

a chilled water recovery system including catch basins disposed below said second conveyor means for recovering spilled chilled water and recycling said chilled water to said ice injection means.

8. An improved apparatus for simultaneously injecting coolant into a plurality of produce containers stacked together and having sides with openings therein, said apparatus of the type having a holding tank for containing the coolant and having a top opening, a support for holding said container stack in a position above said holding tank and over said top opening, a frame to enclose one side of said container stack and including a frame side wall facing the container sides having inwardly facing ports therein aligning with said container openings, means to shift at least some of said frame side walls into contact with said container stack, means to pump coolant from said holding tank into said ports and through said container openings into said containers to cool the produce therein, and drain means for catching and guiding any overflow coolant back into said holding tank, wherein the improvement to said apparatus comprises:

a first conveyor means for receiving a supply of container stacks;

a shuttle means for receiving from said first conveyor a container stack, transporting said container stack into said coolant injection system and retrieving said stack therefrom, said shuttle means having a collection means for receiving said overflow coolant from said container stack and routing said coolant back to said coolant tank;

a second conveyor means for receiving from said shuttle means said container stack, said second conveyor means having a collection means for receiving said overflow coolant from said container stack and routing said coolant back to said coolant tank;

sensing means for detecting the presence and movement of said container stack and generating electrical signals; and control means for receiving said electrical signals and converting said signals into new signals to control said apparatus.

9. An apparatus as in claim 1 wherein said first conveyor means is power driven to move loaded pallets horizontally.

10. An apparatus as in claim 2 wherein said second conveyor means is provided with power driven rollers followed by dead rollers to allow loaded pallets to move intermittently therealong.

11. An apparatus as in claim 3 wherein said second conveyor means is power driven to move loaded pallets therealong.

12. An apparatus as in claim 8 wherein said sensing means may be mechanical switches.

13. An apparatus as in claim 8 wherein said sensing means may be optical switches.

14. The method of automatically loading and unloading an apparatus for icing stacks of containers of produce comprising the steps of:
   simultaneously placing stacks of containers of produce on a first conveyor, said conveyor powered to move said stack horizontally in response to signals generated by a control means;
   moving said stacks of containers into and out of an ice injector with a shuttle, said shuttle moving transversely in response to signals generated by said control means;
   moving said stacks of containers away from said ice injector by moving said stacks horizontally onto a second conveyor; and
   sensing the position of said stacks on said first and second conveyors and said carriage and generating electrical signals for transmission to said control means.

15. An improved system for simultaneously injecting coolant into sides of a plurality of stacked produce containers, said system comprising a catch basin for holding the coolant and having a top opening, a support for holding said stacked produce containers in a position above said catch basin and over said top opening, a frame to enclose one side of said stacked produce containers and including a frame side wall facing the sides of said stacked produce containers and having inwardly facing ports therein aligning with said container openings, means to shift at least some of said frame side walls into contact with said stacked produce containers, means to pump coolant into said ports and through said container openings into said stacked produce containers to cool the produce therein, said catch basin catching and guiding any overflow coolant back into said holding tank, wherein the improvement to said system comprises:
   first conveyor means for receiving a plurality of stacked produce containers;
   shuttle means for receiving from said first conveyor means a plurality of stacked produce containers, transporting said plurality of stacked produce containers into a coolant injection system and retrieving said plurality of stacked produce containers therefrom, said shuttle means having a catch basin for receiving overflow coolant from said plurality of stacked produce containers and routing said coolant back to a coolant tank; and
   second conveyor means for receiving from said shuttle means said plurality of stacked produce containers, said second conveyor means having a catch basin for receiving overflow coolant from said plurality of stacked produce containers and routing said coolant back to said coolant tank.

* * * * *